US012812010B2

(12) United States Patent
Kim et al.

(10) Patent No.: US 12,812,010 B2
(45) Date of Patent: Nov. 24, 2026

(54) PROTOCOL DATA UNIT SESSION MANAGEMENT

(71) Applicant: QUALCOMM Incorporated, San Diego, CA (US)

(72) Inventors: Sunghoon Kim, Seoul (KR); Hong Cheng, Basking Ridge, NJ (US); Lenaig Genevieve Chaponniere, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 180 days.

(21) Appl. No.: 17/447,906

(22) Filed: Sep. 16, 2021

(65) Prior Publication Data

US 2023/0082718 A1 Mar. 16, 2023

(51) Int. Cl.

| | |
|---|---|
| ***H04L 67/146*** | (2022.01) |
| ***H04L 67/02*** | (2022.01) |
| ***H04W 76/11*** | (2018.01) |
| ***H04W 88/04*** | (2009.01) |

(52) U.S. Cl.

CPC ............ *H04L 67/146* (2013.01); *H04L 67/02* (2013.01); *H04W 76/11* (2018.02); *H04W 88/04* (2013.01)

(58) Field of Classification Search

None

See application file for complete search history.

(56) References Cited

U.S. PATENT DOCUMENTS

2016/0227416 A1* 8/2016 Suzuki .............. H04W 72/1215
2017/0055149 A1* 2/2017 Lehtovirta ........ H04W 12/0431
2018/0198767 A1* 7/2018 Choi ..................... H04W 12/08
2020/0077253 A1* 3/2020 Kim ...................... H04W 76/30
2020/0092934 A1* 3/2020 Dou ...................... H04W 72/04
2020/0229007 A1 7/2020 Jung et al.
2021/0185538 A1* 6/2021 Zhang ................. H04W 12/122
2021/0282195 A1 9/2021 Paladugu et al.

(Continued)

FOREIGN PATENT DOCUMENTS

EP 3370473 A1 9/2018
GB 2523328 A 8/2015

(Continued)

OTHER PUBLICATIONS

3GPP TS 23.304 v2.0.0.0. 3rd Generation Partnership Project; Technical Specification Group Services and System Aspects; Proximity based Services (ProSe) in the 5G System (5GS) (Release 17). Sep. 8, 2021. (Year: 2021).*

(Continued)

*Primary Examiner* — Andre Tacdiran

(74) *Attorney, Agent, or Firm* — Harrity & Harrity, LLP

(57) ABSTRACT

Various aspects of the present disclosure generally relate to wireless communication. In some aspects, a wireless device may receive, via a link between the wireless device and a remote user equipment (UE), an identifier associated with the remote UE. The wireless device may transmit, to a session management function (SMF) device, a communication associated with a protocol data unit (PDU) session of the remote UE, the communication including information indicating the identifier. The wireless device may receive, from the SMF device, instructions to manage the PDU session. Numerous other aspects are described.

30 Claims, 10 Drawing Sheets

(56) References Cited

U.S. PATENT DOCUMENTS

| | | | | |
|---|---|---|---|---|
| 2021/0410002 | A1* | 12/2021 | Shariat | H04W 28/24 |
| 2022/0210698 | A1* | 6/2022 | Ly | H04W 4/70 |
| 2022/0240122 | A1* | 7/2022 | Liu | H04W 4/50 |
| 2022/0279348 | A1* | 9/2022 | Youn | H04W 12/06 |
| 2022/0322135 | A1* | 10/2022 | Xu | H04W 40/22 |
| 2022/0353799 | A1* | 11/2022 | Talebi Fard | H04W 8/005 |
| 2022/0377598 | A1* | 11/2022 | Pan | H04W 28/0268 |
| 2022/0408396 | A1* | 12/2022 | Youn | H04W 76/34 |
| 2023/0023571 | A1* | 1/2023 | Xing | H04M 15/93 |
| 2023/0189054 | A1* | 6/2023 | Xing | H04W 28/0257<br>370/229 |
| 2023/0199550 | A1* | 6/2023 | Xing | H04W 28/0215<br>370/329 |

FOREIGN PATENT DOCUMENTS

| | | | |
|---|---|---|---|
| GB | 2601875 | * | 6/2022 |
| WO | WO2021189269 | * | 9/2019 |
| WO | WO2022052798 | * | 9/2020 |
| WO | WO2022030520 | * | 8/2021 |
| WO | WO2021218512 A1 | * | 11/2021 |

OTHER PUBLICATIONS

ETSI TS 133 303 V14.1.0 (Jul. 2017) (Year: 2017).*
3GPP. ETSI TS 133 303 V14.1.0 (Jul. 2017) (Year: 2017).*
International Search Report and Written Opinion—PCT/US2022/075141—ISA/EPO—Dec. 16, 2022.

* cited by examiner

PROTOCOL DATA UNIT SESSION MANAGEMENT

FIELD OF THE DISCLOSURE

Aspects of the present disclosure generally relate to wireless communication and to techniques and apparatuses for protocol data unit session management.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a wireless device. The method may include receiving, via a link between the wireless device and a remote user equipment (UE), an identifier associated with the remote UE. The method may include transmitting, to a session management function (SMF) device, a communication associated with a protocol data unit (PDU) session of the remote UE, the communication including information indicating the identifier. The method may include receiving, from the SMF device, instructions to manage the PDU session.

Some aspects described herein relate to a method of wireless communication performed by a network device. The method may include receiving, from a relay device, a communication associated with a PDU session associated with the relay device and a remote UE, the communication including information indicating an identifier associated with the remote UE. The method may include transmitting, to the relay device and based at least in part on the identifier, instructions to manage the PDU session.

Some aspects described herein relate to a wireless device for wireless communication. The wireless device may include a memory and one or more processors coupled to the memory. The one or more processors may be configured to receive, via a link between the wireless device and a remote UE, an identifier associated with the remote UE. The one or more processors may be configured to transmit, to a SMF device, a communication associated with a PDU session of the remote UE. The one or more processors may be configured to receive, from the SMF device, instructions to manage the PDU session.

Some aspects described herein relate to a network device for wireless communication. The network device may include a memory and one or more processors coupled to the memory. The one or more processors may be configured to receive, from a relay device, a communication associated with a PDU session associated with the relay device and a remote UE. The one or more processors may be configured to transmit, to the relay device and based at least in part on the identifier, instructions to manage the PDU session.

Some aspects described herein relate to a non-transitory computer-readable medium that stores a set of instructions for wireless communication by a wireless device. The set of instructions, when executed by one or more processors of the wireless device, may cause the wireless device to receive, via a link between the wireless device and a remote UE, an identifier associated with the remote UE. The set of instructions, when executed by one or more processors of the wireless device, may cause the wireless device to transmit, to a SMF device, a communication associated with a PDU session of the remote UE. The set of instructions, when executed by one or more processors of the wireless device, may cause the wireless device to receive, from the SMF device, instructions to manage the PDU session.

Some aspects described herein relate to a non-transitory computer-readable medium that stores a set of instructions for wireless communication by a network device. The set of instructions, when executed by one or more processors of the network device, may cause the network device to receive, from a relay device, a communication associated with a PDU session associated with the relay device and a remote UE. The set of instructions, when executed by one or more processors of the network device, may cause the network device to transmit, to the relay device and based at least in part on the identifier, instructions to manage the PDU session.

Some aspects described herein relate to an apparatus for wireless communication. The apparatus may include means for receiving, via a link between the apparatus and a remote UE, an identifier associated with the remote UE. The apparatus may include means for transmitting, to a SMF device, a communication associated with a PDU session of the remote UE, the communication including information indicating the identifier. The apparatus may include means for receiving, from the SMF device, instructions to manage the PDU session.

Some aspects described herein relate to an apparatus for wireless communication. The apparatus may include means for receiving, from a relay device, a communication associated with a PDU session associated with the relay device and a remote UE, the communication including information indicating an identifier associated with the remote UE. The apparatus may include means for transmitting, to the relay device and based at least in part on the identifier, instructions to manage the PDU session.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
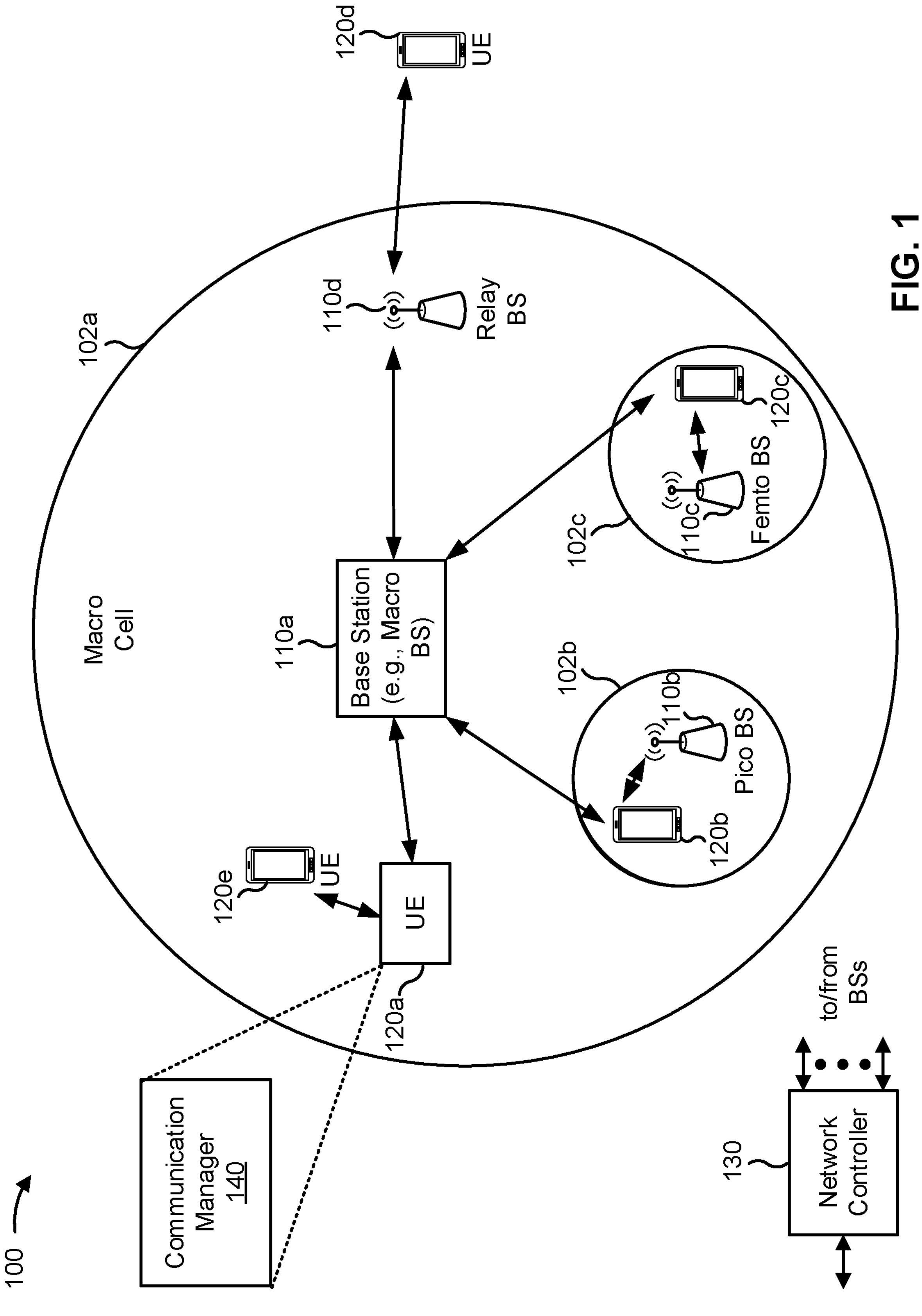
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term “cell” can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, via a link between the wireless device and a remote UE, an identifier associated with the remote UE; transmit, to a session management function (SMF) device, a communication associated with a protocol data unit (PDU) session of the remote UE, the communication including information indicating the identifier; and receive, from the SMF device, instructions to manage the PDU session. Additionally, or alternatively, the communication manager 140 may perform one or more other operations described herein.

As indicated above, FIG. 1 is provided as an example. Other examples may differ from what is described with regard to FIG. 1.

Figure 2:
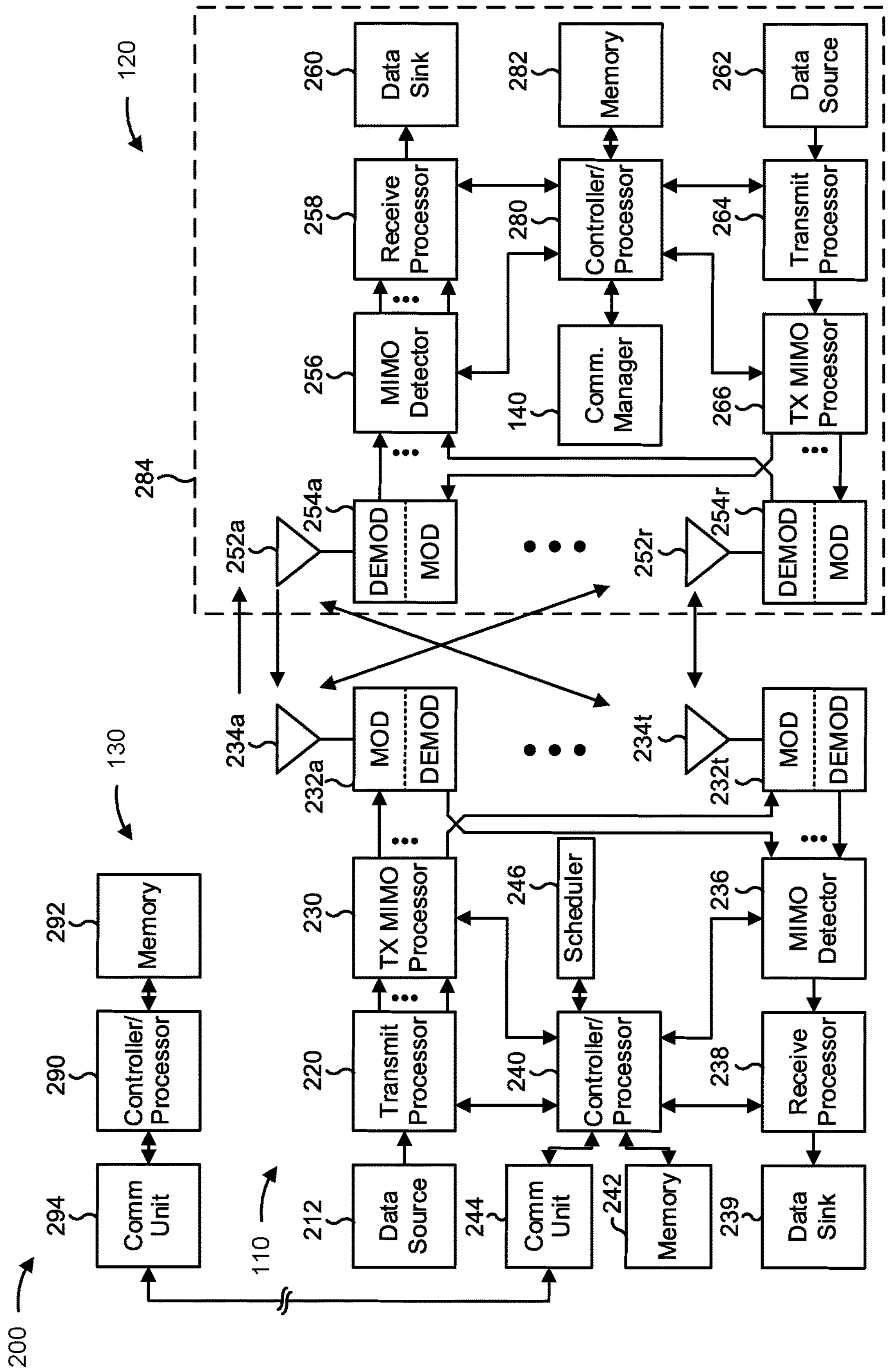
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234*a* through 234*t*, such as T antennas (T≥1). The UE 120 may be equipped with a set of antennas 252*a* through 252*r*, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the base station 110 and/or other base stations 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode)

the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-10).

The controller/processor 240 of the base station 110, the controller/processor 280 of the UE 120, and/or any other component(s) of FIG. 2 may perform one or more techniques associated with PDU session management, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, a wireless device (e.g., a UE 120, including a Layer 3 relay) includes means for receiving, via a link between the wireless device and a remote UE, an identifier associated with the remote UE; means for transmitting, to an SMF device, a communication associated with a PDU session of the remote UE, the communication including information indicating the identifier; and/or means for receiving, from the SMF device, instructions to manage the PDU session. In some aspects, the means for the wireless device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
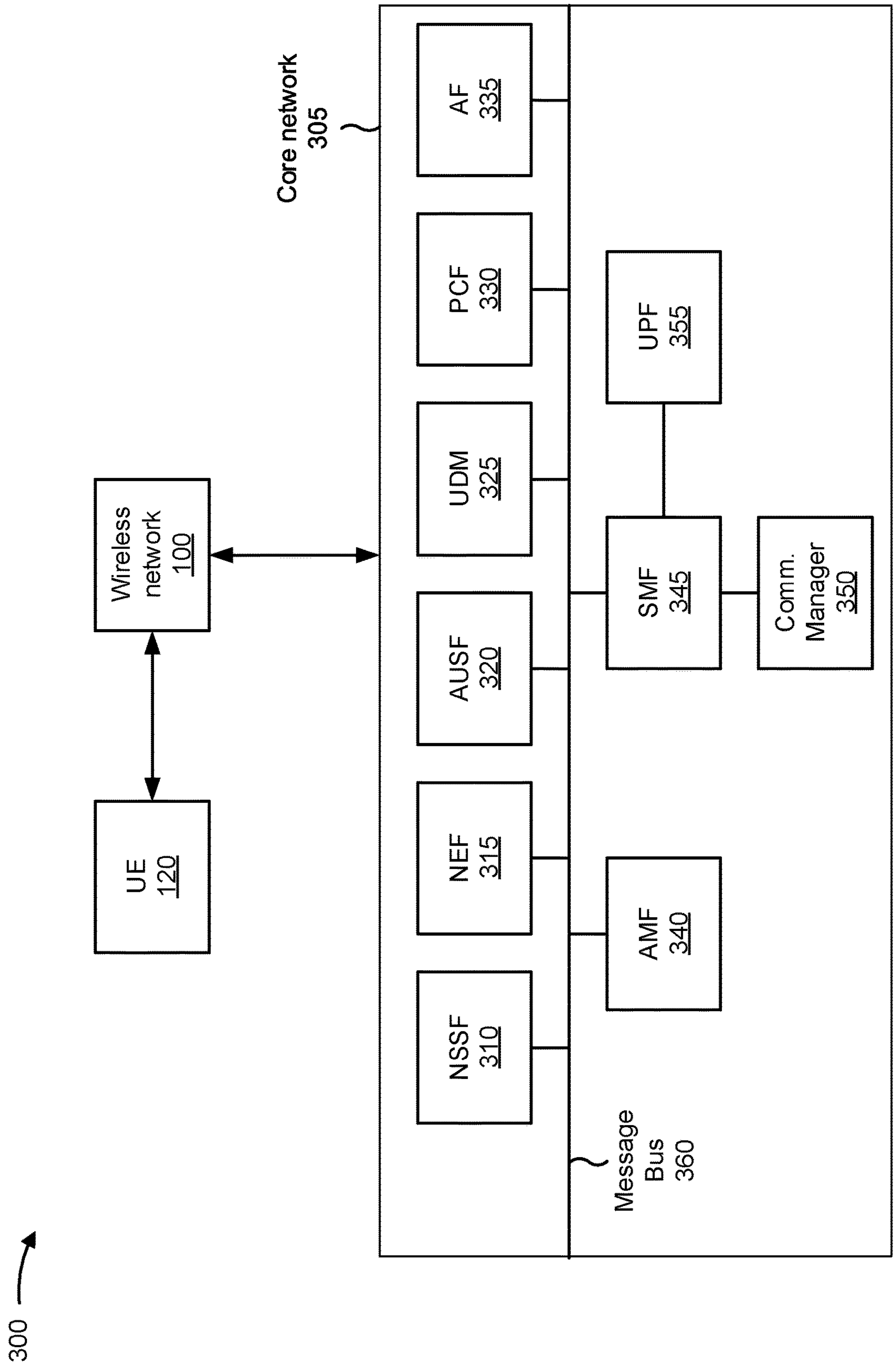
FIG. 3 is a diagram illustrating an example of a core network, in accordance with the present disclosure.

FIG. 3 is a diagram of an example 300 of a core network 305, in accordance with the present disclosure. As shown in FIG. 3, example 300 may include a UE (e.g., UE 120), a wireless communication network 100, and a core network 305. Devices and/or networks of example 300 may interconnect via wired connections, wireless connections, or a combination thereof.

The wireless communication network 100 may support, for example, a cellular RAT. The network 100 may include one or more base stations (e.g., base station 110) and other network entities that can support wireless communication for the UE 120. The network 100 may transfer traffic between the UE 120 (e.g., using a cellular RAT), one or more base stations (e.g., using a wireless interface or a backhaul interface, such as a wired backhaul interface), and/or the core network 305. The network 100 may provide one or more cells that cover geographic areas.

In some aspects, the network 100 may perform scheduling and/or resource management for the UE 120 covered by the network 100 (e.g., the UE 120 covered by a cell provided by the network 100). In some aspects, the network 100 may be controlled or coordinated by a network controller (e.g., network controller 130 of FIG. 1), which may perform load balancing, network-level configuration, and/or the like. As described above in connection with FIG. 1, the network controller may communicate with the network 100 via a wireless or wireline backhaul. In some aspects, the network 100 may include a network controller, a self-organizing network (SON) module or component, or a similar module or component. Accordingly, the network 100 may perform network control, scheduling, and/or network management functions (e.g., for uplink, downlink, and/or sidelink communications of the UE 120 covered by the network 100).

In some aspects, the core network 305 may include an example functional architecture in which systems and/or methods described herein may be implemented. For example, the core network 305 may include an example architecture of a 5G Next Generation (NG) core network included in a 5G wireless telecommunications system. Although the example architecture of the core network 305 shown in FIG. 3 may be an example of a service-based architecture, in some aspects, the core network 305 may be implemented as a reference-point architecture, a 4G core network, and/or the like.

As shown in FIG. 3, the core network 305 may include a number of functional elements. The functional elements may include, for example, a network slice selection function (NSSF) 310, a network exposure function (NEF) 315, an authentication server function (AUSF) 320, a unified data management (UDM) component 325, a policy control function (PCF) 330, an application function (AF) 335, an access and mobility management function (AMF) 340, an SMF 345, a user plane function (UPF) 355, and/or the like. These functional elements may be communicatively connected via a message bus 360. Each of the functional elements shown in FIG. 3 may be implemented on one or more devices associated with a wireless telecommunications system. In some implementations, one or more of the functional elements may be implemented on physical devices, such as an access point, a base station, a gateway, and/or the like. In some implementations, one or more of the functional elements may be implemented on a computing device of a cloud computing environment.

The NSSF 310 may include one or more devices that select network slice instances for the UE 120. Network slicing is a network architecture model in which logically distinct network slices operate using common network infrastructure. For example, several network slices may operate as isolated end-to-end networks customized to satisfy different target service standards for different types of applications executed, at least in part, by the UE 120 and/or communications to and from the UE 120.

The NEF 315 may include one or more devices that support exposure of capabilities and/or events in the wireless telecommunications system to help other entities in the wireless telecommunications system discover network services. The AUSF 320 may include one or more devices that act as an authentication server and support the process of authenticating the UE 120 in the wireless telecommunications system.

The UDM 325 may include one or more devices that store user data and profiles in the wireless telecommunications system. In some aspects, the UDM 325 may be used for fixed access, mobile access, and/or the like, in the core network 305.

The PCF 330 may include one or more devices that provide a policy framework that incorporates network slicing, roaming, packet processing, mobility management, and/or the like The AF 335 may include one or more devices that support application influence on traffic routing, access to the NEF 315, policy control, and/or the like. The AMF 340 may include one or more devices that act as a termination point for non-access stratum (NAS) signaling, mobility management, and/or the like.

The SMF 345 may include one or more devices that support the establishment, modification, and release of communication sessions in the wireless telecommunications system. For example, the SMF 345 may configure traffic steering policies at the UPF 355, enforce user equipment Internet Protocol (IP) address allocation and policies, and/or the like.

In some aspects, the SMF 345 may include a communication manager 350. As described in more detail elsewhere herein, the communication manager 350 may receive, from a relay device, a communication associated with a PDU session associated with the relay device and a remote UE, the communication including information indicating an identifier associated with the remote UE; and transmit, to the relay device and based at least in part on the identifier, instructions to manage the PDU session. Additionally, or alternatively, the communication manager 350 may perform one or more other operations described herein.

The UPF 355 may include one or more devices that serve as an anchor point for intraRAT and/or interRAT mobility. In some aspects, the UPF 355 may apply rules to packets, such as rules pertaining to packet routing, traffic reporting, handling user plane quality of service (QoS), and/or the like.

The message bus 360 may be a logical and/or physical communication structure for communication among the functional elements. Accordingly, the message bus 360 may permit communication between two or more functional elements, whether logically (e.g., using one or more application programming interfaces (APIs) and/or the like) and/or physically (e.g., using one or more wired and/or wireless connections).

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of example 300 may perform one or more functions described as being performed by another set of devices of example environment 300.

As indicated above, FIG. 3 is provided as an example. Other examples may differ from what is described with regard to FIG. 3.

Figure 4:
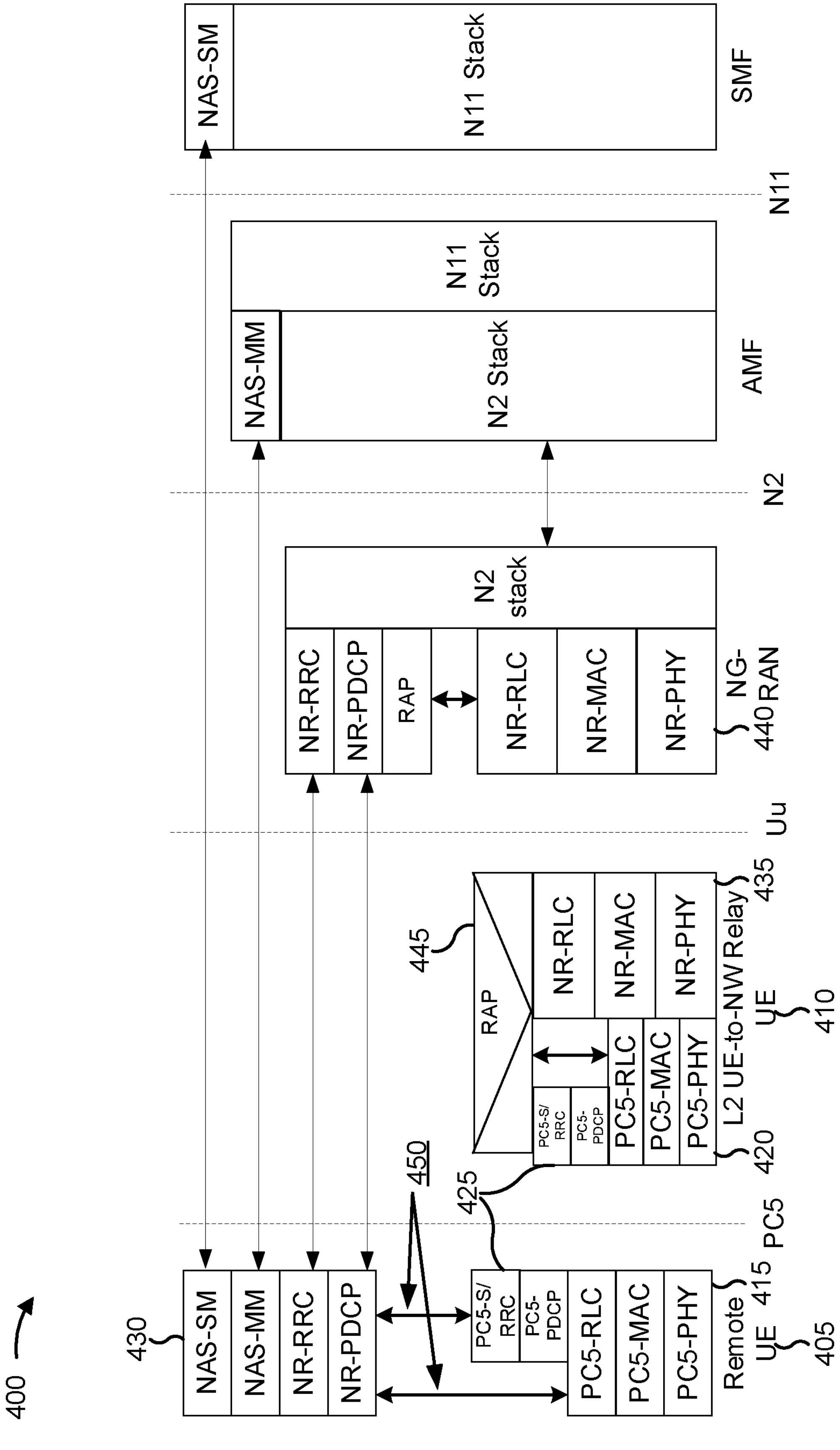
FIG. 4 is a diagram illustrating an example of a control-plane protocol architecture for a Layer 2 UE-to-network relay, in accordance with the present disclosure.
Figure 5:
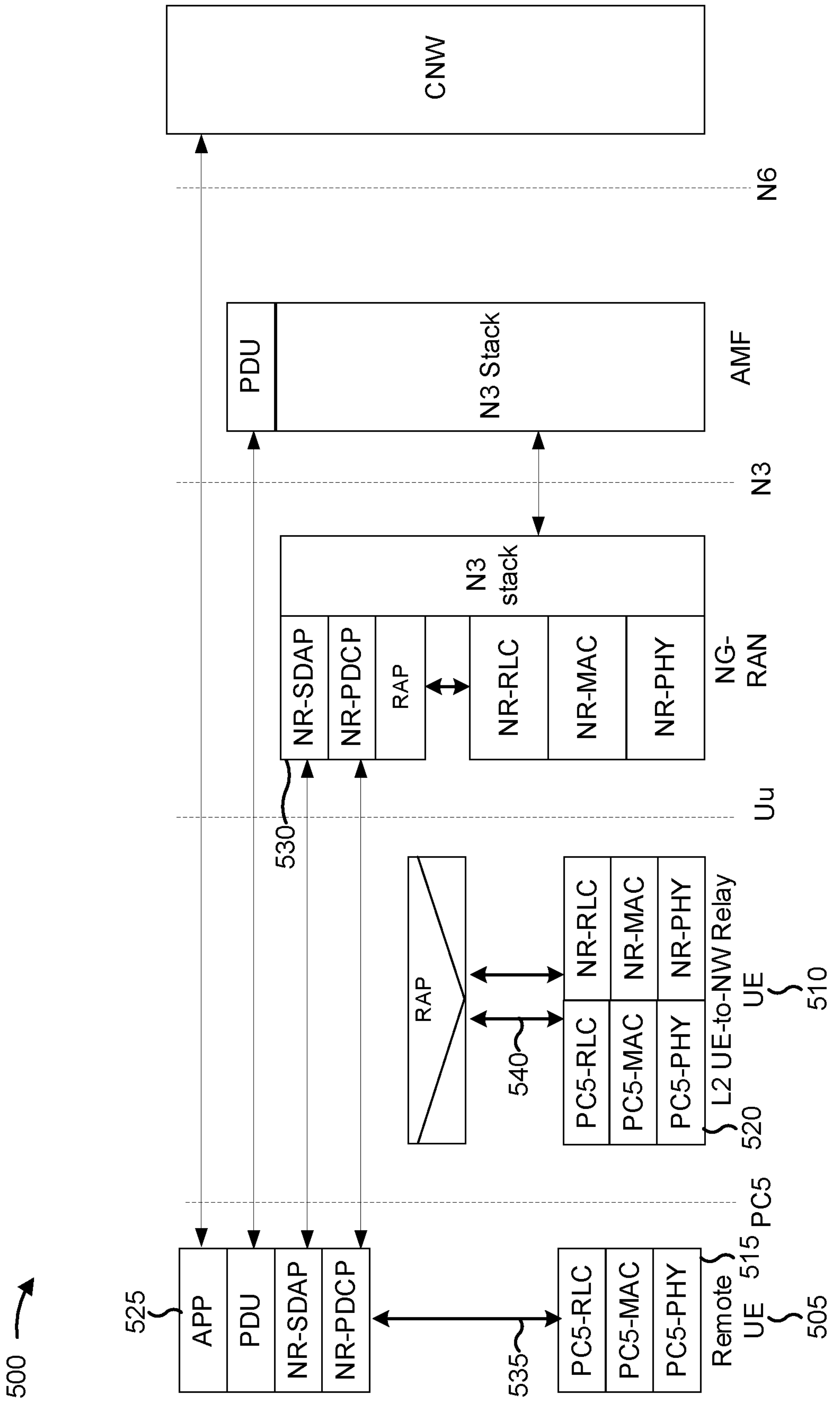
FIG. 5 is a diagram illustrating an example of a user-plane protocol architecture for a Layer 2 UE-to-network relay, in accordance with the present disclosure.

FIG. 4 is a diagram illustrating an example of a control-plane protocol architecture 400 for a Layer 2 UE-to-network relay, in accordance with the present disclosure. FIG. 5 is a diagram illustrating an example of a user-plane protocol architecture 500 for a Layer 2 UE-to-network relay, in accordance with the present disclosure. For example, the control-plane protocol architecture 400 and the user-plane protocol architecture 500 may correspond to a remote UE (e.g., UE 120) shown by reference numbers 405 and 505 and a relay UE (e.g., UE 120) shown by reference numbers 410 and 510.

As shown in FIG. 4, in the control-plane, there may be a PC5 interface (e.g., a sidelink interface) between the remote UE and the relay UE, a Uu interface between the relay UE and a next generation radio access network (NG-RAN), also referred to herein as a 5G access network (5G-AN), an N2 interface between the NG-RAN and an AMF of the control-plane protocol architecture 400, and an N11 interface between the AMF and an SMF.

As shown in FIG. 5, there may be an N3 interface between the NG-RAN and a UPF of the user-plane protocol architecture 500, and an N6 interface between the UPF and a core network (CNW).

As further shown, the remote UE and the relay UE may be associated with respective PC5 protocol stacks 415/420 and 515/520, enabling communication on the PC5 interface between the remote UE and the relay UE. The PC5 protocol stack may include a PC5 radio link control (RLC) component, a PC5 medium access control (MAC) component, a PC5 physical (PHY) component, and/or the like. "PC5" is generally referred to herein as "sidelink" (e.g., sidelink signaling interfaces, sidelink unicast link, sidelink RLC channels, and/or the like). Communications between the remote UE and the relay UE using the PC5 interface may be referred to as sidelink communications. The respective PC5 protocol stacks may be associated with one or more of PC5-S entities, PC5-radio resource control (RRC) entities, or PC5 packet data convergence protocol (PC5-PDCP) entities, as shown by reference number 425. The PC5-S entity may manage a sidelink signaling interface, such as a PC5-S interface. A UE that includes a PC5-S entity and/or a PC5-RRC entity may handle control signaling and configuration of a sidelink connection with another UE, such as the connection used for relaying between the remote UE and the relay UE. In some aspects, the PC5 protocol stacks 415/420 and 515/520 may not include PC5-S entities or PC5-RRC entities. Also, in some cases, the NG-RAN may handle control signaling and configuration of the sidelink connection.

As shown by reference number 430 of FIG. 4, the remote UE is associated with a NAS stack, which includes an NAS session management (NAS-SM) component, and one or more radio access components (e.g., an NR-RRC component and an NR-PDCP component). As shown by reference number 435 of FIG. 4, the relay UE is associated with a radio access stack, including an NR-RLC component, an NR-MAC component, and an NR-PHY component. Furthermore, the NG-RAN is associated with a radio access interface stack shown by reference number 440, which includes an NR-RLC component, an NR-MAC component, an NR-PHY component, an NR-RRC entity, and an NR-PDCP entity.

The adaptation layer entity of the relay UE, shown by reference number 445, may handle relaying from the remote UE to the network or from the network to the remote UE. As used herein, "the network" may refer to any one or more of the NG-RAN, the AMF, the SMF, the UPF, or the CNW. The CNW may be referred to as a 5G core (5GC). In some aspects, the adaptation layer is referred to as an adaptation layer entity. In some aspects, the adaptation layer entity may be a separate entity between an RLC entity and a packet data convergence entity. In some aspects, the adaptation layer entity may be logically part of the packet data convergence entity or the radio link control entity Communication between stacks of the remote UE is indicated by the lines shown by reference number 450. The line between the NR-PDCP entity and the PC5-RLC entity indicates how a message (e.g., an NR RRC message generated by the radio access protocol stack) that is not encapsulated in a sidelink signaling container, such as a PC5-S container, might be communicated from the radio access stack to the PC5 stack for transmission via the sidelink interface, or how a message that is not encapsulated in a PC5-S container might be communicated from the PC5 stack to the radio access stack after being received via the sidelink interface. Note that the line between the NR-PDCP entity and the PC5-RLC entity does not involve the PC5-S or PC5-PDCP entities, meaning that the PC5-S and PC5-PDCP entities do not handle such messages. A similar line is shown to indicate communication between the adaptation layer and the PC5-RLC entity that bypasses the PC5-S and PC5-PDCP entities of the relay UE.

The line between the NR-PDCP entity and the PC5-S or PC5-RRC entity indicates how a message (e.g., an NR RRC message generated by the radio access protocol stack) that is encapsulated in a PC5-S container might be communicated from the radio access stack to the PC5 stack for transmission via the sidelink interface, or how a message that is encapsulated in a PC5-S container might be communicated from the PC5 stack to the radio access stack after being received via the sidelink interface. Note that the line between the NR-PDCP entity and the PC5-RLC entity involves the PC5-S entity, meaning that the PC5-S entity may handle such messages.

As shown by reference number 525 of FIG. 5, the remote UE is associated with a user-plane protocol stack, which may include an application (APP) component, a PDU component, an NR service data application protocol (NR-SDAP) component, and an NR-PDCP component. Furthermore, the NG-RAN is associated with user-plane components shown by reference number 530, which include an NR-SDAP component and an NR-PDCP component. The NR-SDAP component and the NR-PDCP component may be referred to herein as radio access entities.

NR user-plane traffic (shown by a line indicated by "NR UP") may be transported between the NR-PDCP entity and the PC5-RLC component, as shown by reference number 535. Such NR user-plane traffic may be transported to the relay UE via one or more bearers, such as a data radio bearer (DRB) or signaling radio bearer (SRB). DRBs and SRBs can also be referred to as radio bearers or radio access bearers. As shown by reference number 540, the NR user-plane traffic may be provided from the PC5 stack of the relay UE to the adaptation component, and from the adaptation component to the radio access stack of the relay UE. The radio access stack of the relay UE may provide the NR user-plane traffic to the NG-RAN (not shown).

The physical layer may offer, to the MAC sublayer, transport channels. The MAC sublayer may offer, to the RLC sublayer, logical channels. The RLC sublayer may offer, to the PDCP sublayer, RLC channels. The PDCP sublayer may offer, to the SDAP sublayer, radio bearers. The SDAP sublayer may offer, to the CNW, QoS flows. The RAP layer may handle the mapping of these types of flows, channels, and bearers to each other to facilitate Layer 2 relay services. In some aspects, the RAP layer may be referred to as an adaptation layer, a relay adaption layer, and/or the like. A radio access bearer may include an SRB, a DRB, and/or the like. An RLC channel can also be referred to as an RLC bearer. In such a case, an RLC channel identifier associated with the RLC channel may be referred to as an RLC bearer identifier.

As indicated above, FIGS. 4 and 5 are provided as examples. Other examples may differ from what is described with respect to FIGS. 4 and 5.

In some aspects, a relay UE may provide Layer 3 relay services (e.g., to provide generic functionality that can relay any IP, Ethernet or Unstructured traffic). A Layer 3 relay service may be associated with an identifier, referred to as a relay service code (RSC). The type of traffic supported over PC5 may be indicated by the relay UE (e.g. using the corresponding RSC). The relay UE may determine a PDU session type based on configuration of the mapping between PDU Session parameters and RSC. IP type PDU sessions and Ethernet type PDU sessions may be used to support more than one remote UE, while Unstructured type PDU sessions may only support one remote UE.

In a Layer 3 relay environment, there is no clear restriction on whether a relay UE should use a particular PDU session for relaying network traffic. In addition, it may be unclear if any relay services (for any RSCs) are applicable to a PDU session. Even if a relay UE is using a particular PDU session to relay network traffic, there is no way to detect if the relay UE forwards the network traffic via a PDU session that is not applicable for the relay service applicable to the PDU session. Furthermore, there is no available enforcement mechanism to manage network traffic from the remote UE, and while a PDU session may be shared by multiple remote UEs, it may be difficult to control traffic from any particular remote UE having network traffic relayed via the PDU session.

Some techniques and apparatuses described herein enable PDU session management by a relay UE and SMF device. For example, a relay UE may associate a remote UE identifier with a PDU session identifier, which may be used to identify and manage network traffic for a particular remote UE, whether the PDU session is supporting one or multiple remote UEs. The relay UE may provide, to an SMF device, information enabling the SMF device to determine how network traffic associated with the relay UE is to be managed. The SMF may then provide instructions to the relay UE to enable the relay UE to manage the PDU session (e.g., by releasing or modifying the link between the relay UE and the remote UE). As a result, a network operator is able to manage relayed (e.g., via a Layer 3 relay) network traffic for a particular remote UE, even in a situation where multiple remote UEs are using a single PDU session. The ability to more granularly manage PDU sessions may provide network security and efficiency benefits, as well as facilitating network operator policy management. For example, security may be improved by enabling particular remote UEs to be identified and distinguished from other remote UEs that may use the same PDU session, which may facilitate specific network security enforcement actions and policy enforcement (e.g., action can be taken against a particular remote UE for a security and/or policy violation). In addition, network efficiency may be improved by enabling multiple remote UEs per PDU session while retaining the ability to individually manage links between the relay UE and remote UE. This may obviate a need to release a PDU session serving multiple remote UEs when only one remote UE using the PDU session could be released instead, conserving resources associated with terminating, establishing, and/or re-establishing PDU sessions.

Figure 6:
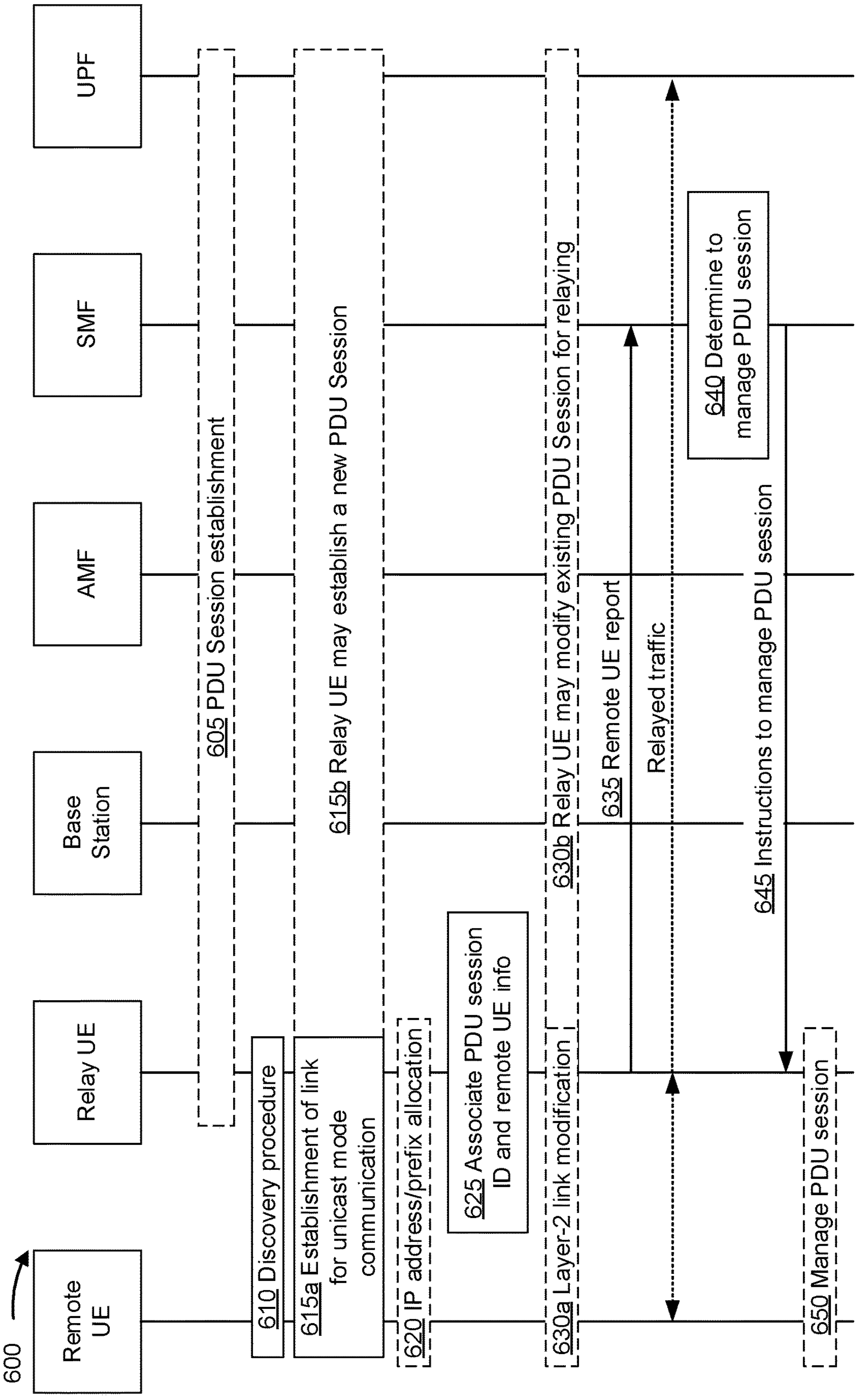
FIG. 6 is a diagram illustrating an example associated with protocol data unit (PDU) session management, in accordance with the present disclosure.

FIG. 6 is a diagram illustrating an example 600 associated with PDU session management for relaying communications, in accordance with the present disclosure. As shown in FIG. 6, a relay UE (e.g., a Layer 3 relay, such as UE 120) may communicate with a remote UE (e.g., UE 120) to relay Layer 3 network traffic between the remote UE and one or more devices of a wireless network (e.g., wireless network 100), such as a base station (e.g., base station 110), an AMF device (e.g., AMF 340), an SMF device (e.g., SMF 345), and a UPF device (e.g., UPF 355).

As shown by reference number 605, the relay UE may establish a PDU session that provides end-to-end user plane connectivity between the relay UE and the UPF. For example, the PDU session may support one or more QoS flows for providing network traffic between the relay UE and UPF. In some aspects, the PDU session may be established after an authorization and provisioning procedure that provides the relay UE with parameters (e.g., ProSe relay discovery parameters, among other examples) for acting as a Layer 3 relay.

As shown by reference number 610, the relay UE may use one or more discovery messages to advertise RSCs supported by the relay UE. In some aspects, the relay UE may provide the discovery messages in response to a request received from a remote UE. The one or more discovery messages may enable the remote UE to determine whether it will connect to the relay UE (e.g., based on whether the RSCs supported by the relay UE are of interest to the remote UE).

As shown by reference number 615*a*, the relay UE and the remote UE may establish a link for unicast communication. In some aspects, the link between the relay UE and the remote UE may be established via sidelink (e.g., PC5 reference point). The type of network traffic supported by the link may include, as described herein, IP, Ethernet, and/or Unstructured traffic (e.g., as indicated using corresponding RSCs).

In some aspects, as shown by reference number 615*b*, the relay UE may establish a new PDU session for the network traffic to be relayed on behalf of the remote UE. In some aspects, the relay UE may use an existing PDU session to handle the network traffic (e.g., in a situation where the existing PDU session supports the type of network traffic being relayed).

In some aspects, the relay UE may receive, via the link between the remote UE and the relay UE, an identifier associated with the remote UE (e.g., an IP address, MAC address, and/or the like). In some aspects, the relay UE may receive remote UE data associated with the remote UE (e.g., in association with establishment of the PDU session). For example, the relay UE may receive, from the remote UE, one or more of: a remote UE identifier associated with a ProSe key management function (PKMF), an IP address of the remote UE, a MAC address of the remote UE and data indicating Ethernet type, or one or more ProSe service types associated with the PDU session.

As shown by reference number 620, in some aspects, the relay UE may allocate an IP address/prefix to the remote UE (e.g., in a situation where the PDU session supports IP network traffic). The IP address/prefix provides the remote UE with an identifier to be associated with IP network traffic relayed on behalf of the remote UE.

As shown by reference number 625, the relay UE may associate an identifier of the remote UE with a PDU session identifier (e.g., to create an identifier that identifies both the remote UE and the PDU session). For example, the relay UE may associate the PDU session ID with the IP address of the remote UE. In some aspects, additional or alternative remote UE data may be associated with the PDU session ID, such as: the remote UE identifier associated with the PKMF, the MAC address of the remote UE and data indicating the Ethernet type, or one or more ProSe service types associated with the PDU session.

As shown by reference number 630*a* and 630*b*, the relay UE may modify the Layer-2 link (e.g., sidelink) and/or the existing PDU session to be used for relaying network traffic. For example, in a situation where a QoS flow requested by the remote UE is not supported by the existing PDU session, the relay UE may modify the existing PDU session or establish a new PDU session to support the QoS flow.

As shown by reference number 635, the relay UE may transmit, and the SMF device may receive, a remote UE report. The remote UE report may include a communication associated with the PDU session of the remote UE and may include information indicating the identifier associated with the remote UE. For example, the remote UE report may indicate, to the SMF device, the associated PDU session identifier and relay UE data, such as the IP address of the remote UE, the MAC address of the remote UE and data indicating Ethernet type, the remote UE identifier associated with the PKMF, and/or one or more ProSe service types associated with the PDU session.

As shown by reference number 640, the SMF device may determine to manage the PDU session. In some aspects, the SMF device may determine to manage the PDU session based at least in part on a subscription associated with the remote UE, and/or an operator policy associated with the PDU session. For example, subscription data may indicate that the remote UE may not be allowed, or may no longer be allowed, to use the PDU session for relaying network traffic. As another example, operator policy may restrict the remote UE from using one or more ProSe service types. In some situations, the SMF device may determine that abusive or otherwise malicious network traffic associated with the remote UE violated the operator policy and would require PDU session management.

In some aspects, the SMF device identifies specific traffic from the remote UE by the identifier (e.g., the identifier provided in the remote UE report and/or associated with the PDU session). For example, the SMF device may identify an IP 3-tuple or 5-tuple, identify the corresponding packet filter for the corresponding remote UE, determine that traffic for the corresponding QoS flow, and restrict the corresponding packet filter of the QoS flow (e.g., to change the QoS of the network traffic). In a situation where the remote UE is communicating via Ethernet, the SMF may identify the remote UE by an Ethernet header (e.g., including destination MAC address, source MAC address, Ethernet type, and/or the like). In a situation where the network traffic being relayed is encapsulated using IP encapsulation (e.g., relaying Ethernet or unstructured traffic by using an IP type PDU session), the IP address and port number (e.g., tunnelling information) may be used to identify the network traffic from the remote UE. After identifying the network traffic of the remote UE to be restricted, the SMF device may identify the corresponding QoS flow and corresponding packet filter to determine instructions for managing the PDU session.

In some aspects, the SMF device may determine to restrict the network traffic of the remote UE from a specific QoS flow. For example, the SMF device may determine that network traffic previously matching the specific QoS flow should match another packet filter (e.g., a packet filter associated with a default QoS flow). In some aspects, the SMF device may determine to restrict the traffic of the remote UE from the PDU session. For example, the SMF device may determine that the relay UE should use a modified QoS rule to exclude traffic from the remote UE from being relayed via the PDU session.

As shown by reference number 645, the SMF device may transmit, and the relay UE may receive, instructions to manage the PDU session. In some aspects, the instructions may include instructions for the relay UE to release the link with the remote UE and/or instructions for the relay device to modify the link with the remote UE. For example, instructions to modify the link may include instructions to remove a packet filter associated with the PDU session. Instructions to release the link with the remote UE may cause the remote UE to end the sidelink session between the relay UE and the remote UE.

In some aspects, the instructions may include a PDU session modification command message with an updated QoS flow rule for removing a specific packet filter for the relayed traffic. In some aspects, a PDU session modification command may include an updated QoS rule.

In some aspects, the instructions may be communicated using a session management NAS message. For example, the SMF device may include, in the instructions, a PDU session identifier and one or more IP tuples for the remote UE to be restricted. The SMF device may provide the remote UE identifier with the instructions (e.g., in a situation where the relay UE provided the remote UE identifier in the remote UE report).

As shown by reference number 650, the relay UE may manage the PDU session. In some aspects, the relay UE may release the link based at least in part on the instructions. For example, in a situation where the instructions identify a PDU session to be released, the relay UE may drop any links with the remote UE using the PDU session and, optionally, release the PDU session. In some aspects, the relay UE may modify the link based at least in part on the instructions. In some aspects, modifying the link may include removing a packet filter associated with the PDU session.

In some aspects, the SMF device may transmit, and the relay UE may receive, data indicating a timer associated with the instructions. For example, the timer may indicate a period of time for which the instructions are to be enforced. In this situation, the relay UE may receive, from the remote UE, a relay communication associated with the PDU session and reject the relay communication based at least in part on the timer. The timer may cause the relay UE to stop relaying particular network traffic for a particular remote UE until the timer has expired, or to apply a particular packet filter until the timer has expired, among other examples. The timer may be previously configured and/or established for different circumstances (e.g., enabling different timers to be applied for different restrictions).

In some aspects, the relay UE may transmit, to the remote UE, data indicating the timer and information regarding the network traffic to be restricted. For example, prior to managing the PDU session (e.g., if the link with the remote UE is to be released) or after managing the PDU session (e.g., if network traffic being relayed is restricted), the relay UE may inform the remote UE of the restriction and, optionally, the timer. In some aspects, the remote UE may use the timer as a backoff timer, during which the remote UE refrains from using the relay UE for network traffic that would subject to restriction within the time indicated by the timer. In some aspects, a remote UE may, after being informed of a network traffic restriction and/or timer, attempt to use the relay UE again for network traffic that was subject to restriction. In this situation, the relay UE may provide an additional remote UE report, which may enable the SMF device to determine whether the remote UE is eligible for using the relay UE or if the remote UE is still subject to restriction (e.g., based on the timer).

As indicated above, FIG. 6 is provided as an example. Other examples may differ from what is described with regard to FIG. 6.

Figure 7:
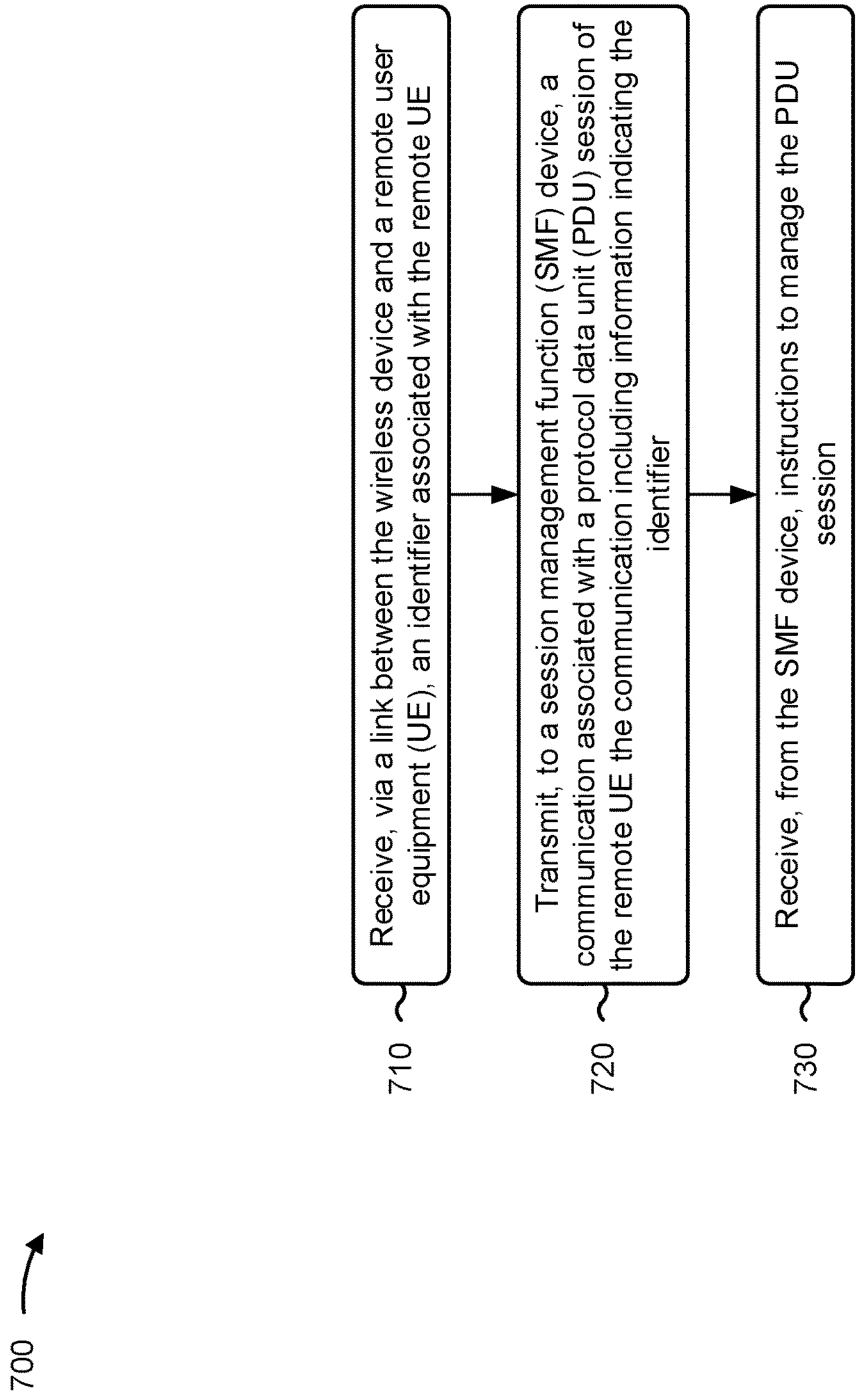
FIGS. 7 and 8 are diagrams illustrating example processes associated with PDU session management, in accordance with the present disclosure.

FIG. 7 is a diagram illustrating an example process 700 performed, for example, by a wireless device, in accordance with the present disclosure. Example process 700 is an example where the wireless device (e.g., a Layer 3 relay, such as UE 120) performs operations associated with PDU session management.

As shown in FIG. 7, in some aspects, process 700 may include receiving, via a link between the wireless device and a remote UE, an identifier associated with the remote UE (block 710). For example, the wireless device (e.g., using communication manager 140 and/or reception component 9002, depicted in FIG. 9) may receive, via a link between the wireless device and a remote UE, an identifier associated with the remote UE, as described above.

As further shown in FIG. 7, in some aspects, process 700 may include transmitting, to an SMF device, a communication associated with a PDU session of the remote UE, the communication including information indicating the identifier (block 720). For example, the wireless device (e.g., using communication manager 140 and/or transmission component 9004, depicted in FIG. 9) may transmit, to an SMF device, a communication associated with a PDU session of the remote UE, the communication including information indicating the identifier, as described above.

As further shown in FIG. 7, in some aspects, process 700 may include receiving, from the SMF device, instructions to manage the PDU session (block 730). For example, the wireless device (e.g., using communication manager 140 and/or reception component 902, depicted in FIG. 9) may receive, from the SMF device, instructions to manage the PDU session, as described above.

Process 700 may include additional aspects, such as any single aspect or any combination of aspects described below and/or in connection with one or more other processes described elsewhere herein.

With respect to process 700, in a first aspect, process 700 includes releasing the link based at least in part on receiving the instructions.

With respect to process 700, in a second aspect, alone or in combination with the first aspect, process 700 includes modifying the link based at least in part on receiving the instructions.

With respect to process 700, in a third aspect, alone or in combination with one or more of the first and second aspects, modifying the link comprises removing a packet filter associated with the PDU session.

With respect to process 700, in a fourth aspect, alone or in combination with one or more of the first through third aspects, process 700 includes associating the identifier with a PDU session identifier, wherein the information indicating the identifier comprises the identifier and the PDU session identifier.

With respect to process 700, in a fifth aspect, alone or in combination with one or more of the first through fourth aspects, process 700 includes receiving remote UE data, the remote UE data comprising at least one of a remote UE identifier associated with a PKMF, an IP address of the remote UE, a MAC address of the remote UE and data indicating Ethernet type, or one or more ProSe service types associated with the PDU session.

With respect to process 700, in a sixth aspect, alone or in combination with one or more of the first through fifth aspects, the communication includes at least one of a PDU session identifier, an IP address of the remote UE, a MAC address of the remote UE and data indicating Ethernet type, a remote UE identifier associated with a PKMF, or one or more ProSe service types associated with the PDU session.

With respect to process 700, in a seventh aspect, alone or in combination with one or more of the first through sixth aspects, receiving the instructions comprises receiving the instructions via a session management non-access stratum message.

With respect to process 700, in an eighth aspect, alone or in combination with one or more of the first through seventh aspects, process 700 includes receiving, from the SMF device, data indicating a timer associated with the instructions, receiving, from the remote UE, a relay communication associated with the PDU session, and rejecting the relay communication based at least in part on the timer.

With respect to process 700, in a ninth aspect, alone or in combination with one or more of the first through eight aspects, process 700 includes transmitting, to the remote UE, data indicating a timer associated with a restriction associated with the PDU session.

With respect to process 700, in a tenth aspect, alone or in combination with one or more of the first through ninth aspects, the wireless device is a Layer 3 relay.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
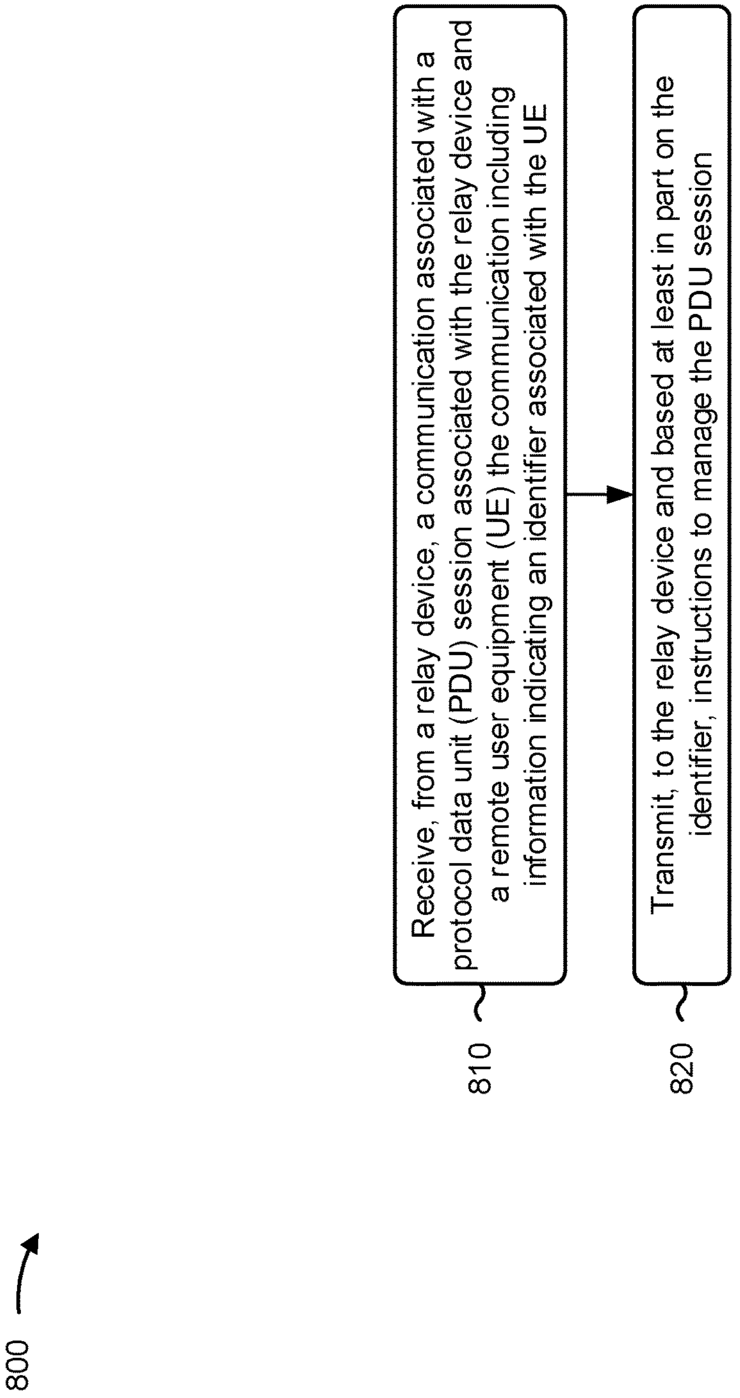

FIG. 8 is a diagram illustrating an example process 800 performed, for example, by a network device, in accordance with the present disclosure. Example process 800 is an example where the network device (e.g., SMF 345) performs operations associated with protocol data unit session management.

As shown in FIG. 8, in some aspects, process 800 may include receiving, from a relay device, a communication associated with a PDU session associated with the relay device and a remote UE, the communication including information indicating an identifier associated with the remote UE (block 810). For example, the network device (e.g., using communication manager 350 and/or reception component 1002, depicted in FIG. 10) may receive, from a relay device, a communication associated with a PDU session associated with the relay device and a remote UE, the communication including information indicating an identifier associated with the remote UE, as described above.

As further shown in FIG. 8, in some aspects, process 800 may include transmitting, to the relay device and based at least in part on the identifier, instructions to manage the PDU session (block 820). For example, the network device (e.g., using communication manager 350 and/or transmission component 1004, depicted in FIG. 10) may transmit, to the relay device and based at least in part on the identifier, instructions to manage the PDU session, as described above.

Process 800 may include additional aspects, such as any single aspect or any combination of aspects described below and/or in connection with one or more other processes described elsewhere herein.

With respect to process 800, in a first aspect, the instructions include instructions for the relay device to release a link with the remote UE.

With respect to process 800, in a second aspect, alone or in combination with the first aspect, the instructions include instructions for the relay device to modify a link with the remote UE.

With respect to process 800, in a third aspect, alone or in combination with one or more of the first and second aspects, the instructions to modify the link includes instructions to remove a packet filter associated with the PDU session.

With respect to process 800, in a fourth aspect, alone or in combination with one or more of the first through third aspects, process 800 includes determining to manage the PDU session based at least in part on at least one of a subscription associated with the remote UE, or an operator policy associated with the PDU session.

With respect to process 800, in a fifth aspect, alone or in combination with one or more of the first through fourth aspects, the information indicating the identifier comprises the identifier and a PDU session identifier of the PDU session.

With respect to process 800, in a sixth aspect, alone or in combination with one or more of the first through fifth aspects, the communication includes at least one of a PDU session identifier, an IP address of the remote UE, a MAC address of the remote UE and data indicating Ethernet type, a remote UE identifier associated with a PKMF, or one or more ProSe service types associated with the PDU session.

With respect to process 800, in a seventh aspect, alone or in combination with one or more of the first through sixth aspects, transmitting the instructions comprises transmitting the instructions via a session management non-access stratum message.

With respect to process 800, in an eighth aspect, alone or in combination with one or more of the first through seventh aspects, process 800 includes transmitting, to the relay device, data indicating a timer associated with the instructions.

With respect to process 800, in a ninth aspect, alone or in combination with one or more of the first through eighth aspects, the network device is an SMF device.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

In this way, a network operator is able to manage relayed (e.g., via a Layer 3 relay) network traffic for a particular remote UE, even in a situation where multiple remote UEs are using a single PDU session. The ability to more granularly manage PDU sessions may provide network security and efficiency benefits, as well as facilitating network operator policy management. For example, security may be improved by enabling particular remote UEs to be identified, and distinguished from other remote UEs that may use the same PDU session, which may facilitate specific network security enforcement actions and policy enforcement (e.g., action can be taken against a particular remote UE for a security and/or policy violation). In addition, network efficiency may be improved by enabling multiple remote UEs per PDU session while retaining the ability to individually manage links between the relay UE and remote UE. This may obviate a need to release a PDU session serving multiple remote UEs when only one remote UE using the PDU session could be released instead, conserving resources associated with terminating, establishing, and/or re-establishing PDU sessions.

Figure 9:
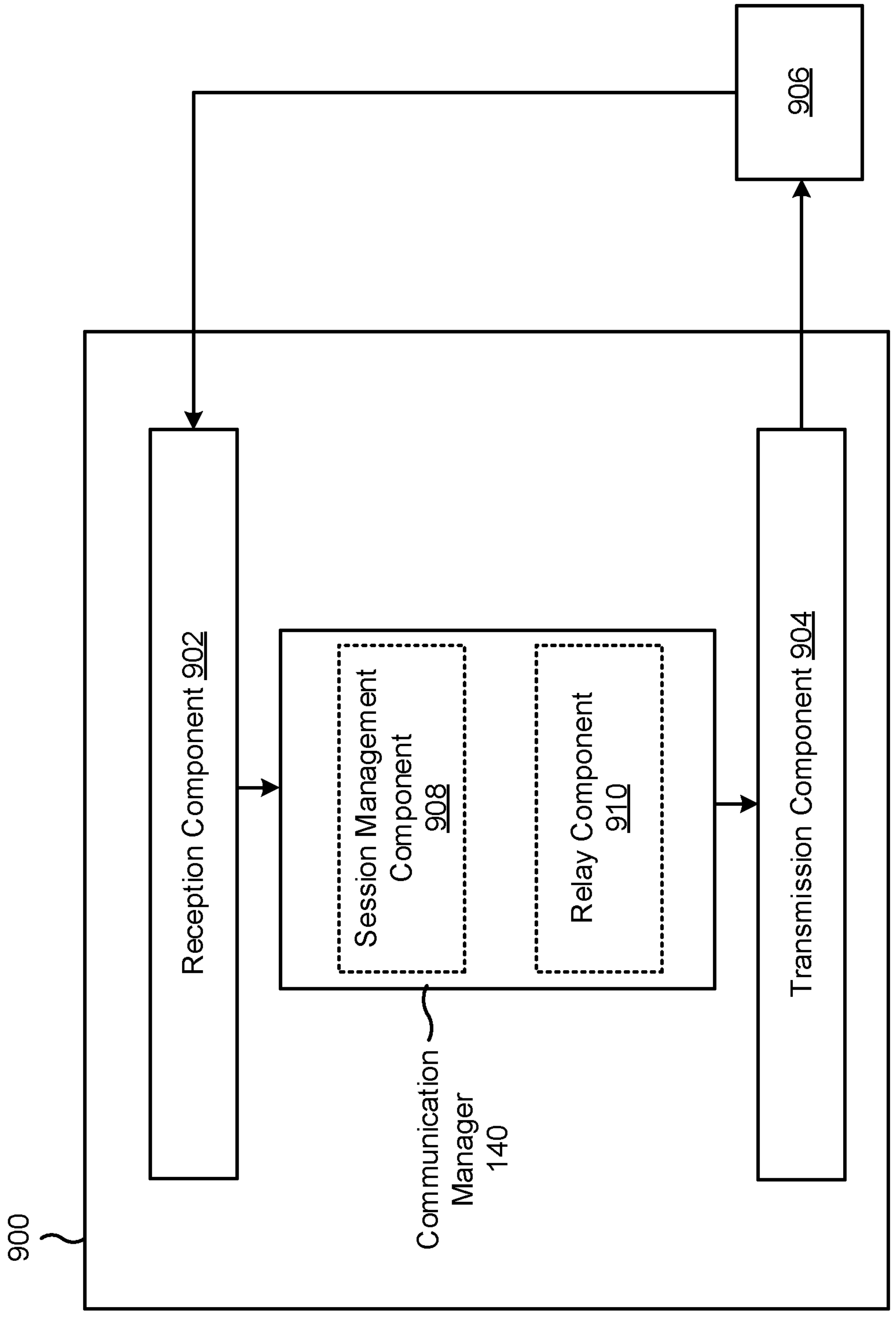
FIGS. 9 and 10 are diagrams of example apparatuses for wireless communication, in accordance with the present disclosure.

FIG. 9 is a diagram of an example apparatus 900 for wireless communication. The apparatus 900 may be a Layer 3 relay (e.g., UE 120), or a Layer 3 relay may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include one or more of a session management component 908, of a relay component 910, among other examples.

In some aspects, the apparatus 900 may be configured to perform one or more operations described herein in connection with FIGS. 4-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the wireless device described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the wireless device described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the wireless device described in connection with FIG. 2. In some aspects, the transmission component 904 may be co-located with the reception component 902 in a transceiver.

The reception component 902 may receive, via a link between the wireless device and a remote UE, an identifier associated with the remote UE. The transmission component 904 may transmit, to an SMF device, a communication associated with a PDU session of the remote UE the communication including information indicating the identifier. The reception component 902 may receive, from the SMF device, instructions to manage the PDU session.

The session management component 908 may release the link based at least in part on receiving the instructions.

The session management component 908 may modify the link based at least in part on receiving the instructions.

The session management component 908 may associate the identifier with a PDU session identifier wherein the information indicating the identifier comprises the identifier and the PDU session identifier.

The reception component 902 may receive remote UE data, the remote UE data comprising at least one of a remote UE identifier associated with a PKMF, an IP address of the remote UE, a MAC address of the remote UE and data indicating Ethernet type, or one or more ProSe service types associated with the PDU session.

The reception component 902 may receive, from the SMF device, data indicating a timer associated with the instructions.

The reception component 902 may receive, from the remote UE, a relay communication associated with the PDU session.

The relay component 910 may reject the relay communication based at least in part on the timer.

The transmission component 904 may transmit, to the remote UE, data indicating a timer associated with a restriction associated with the PDU session.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
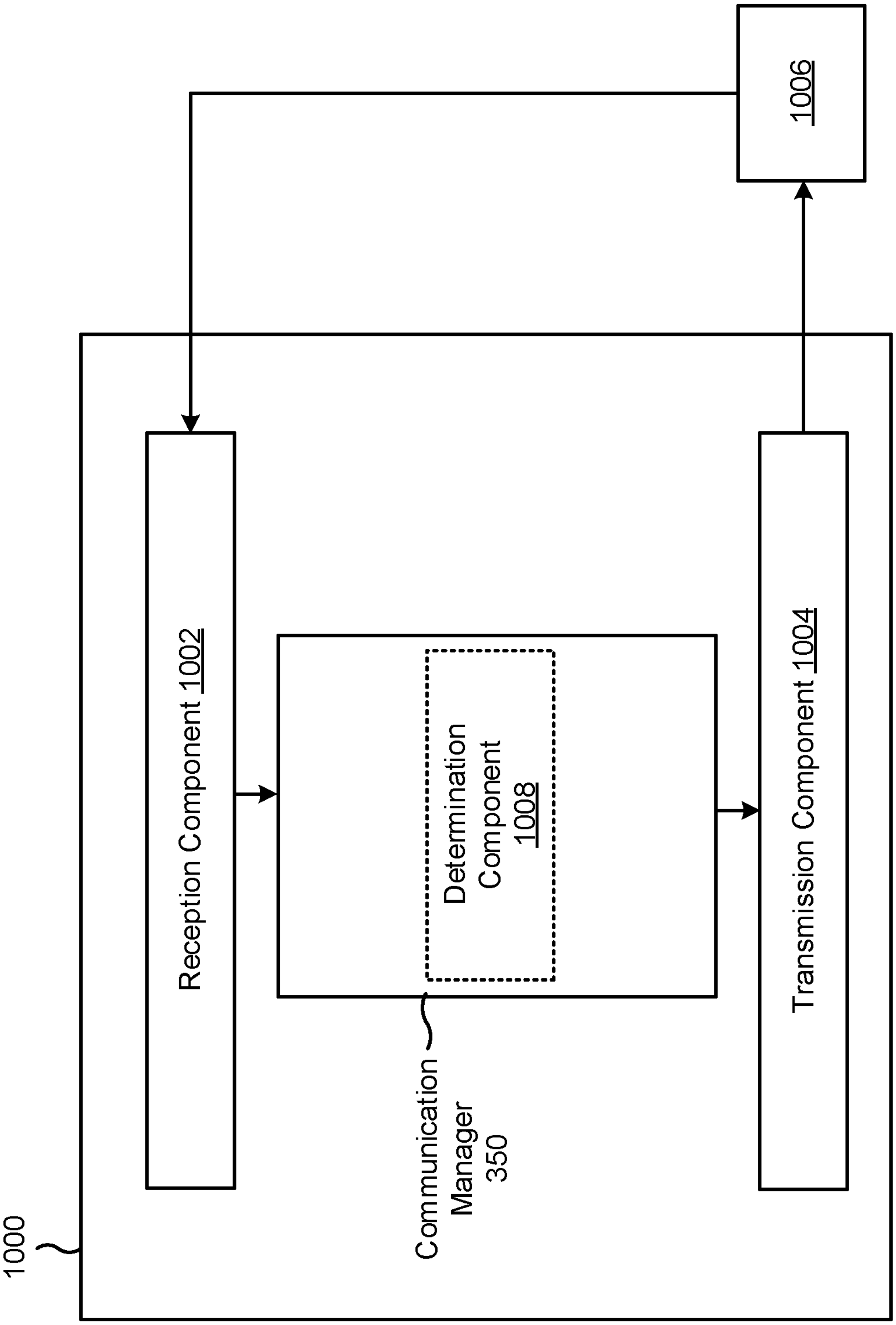

FIG. 10 is a diagram of an example apparatus 1000 for wireless communication. The apparatus 1000 may be an SMF device (e.g., SMF 345), or an SMF device may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 350. The communication manager 350 may include a determination component 1012, among other examples.

In some aspects, the apparatus 1000 may be configured to perform one or more operations described herein in connection with FIGS. 4-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the network device described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network device described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network device described in connection with FIG. 2. In some aspects, the transmission component 1004 may be co-located with the reception component 1002 in a transceiver.

The reception component 1002 may receive, from a relay device, a communication associated with a PDU session associated with the relay device and a remote UE the communication including information indicating an identifier associated with the remote UE. The transmission component 1004 may transmit, to the relay device and based at least in part on the identifier, instructions to manage the PDU session.

The determination component 1008 may determine to manage the PDU session based at least in part on at least one of a subscription associated with the remote UE, or an operator policy associated with the PDU session.

The transmission component 1004 may transmit, to the relay device, data indicating a timer associated with the instructions.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a wireless device, comprising: receiving, via a link between the wireless device and a remote UE, an identifier associated with the remote UE; transmitting, to a SMF device, a communication associated with a PDU session of the remote UE, the communication including information indicating the identifier; and receiving, from the SMF device, instructions to manage the PDU session.

Aspect 2: The method of Aspect 1, further comprising: releasing the link based at least in part on receiving the instructions.

Aspect 3: The method of any of Aspects 1-2, further comprising: modifying the link based at least in part on receiving the instructions.

Aspect 4: The method of Aspect 3, wherein modifying the link comprises:

removing a packet filter associated with the PDU session.

Aspect 5: The method of any of Aspects 1-4, further comprising: associating the identifier with a PDU session identifier, wherein the information indicating the identifier comprises the identifier and the PDU session identifier.

Aspect 6: The method of any of Aspects 1-5, further comprising: receiving remote UE data, the remote UE data comprising at least one of: a remote UE identifier associated with a PKMF, an IP address of the remote UE, a MAC address of the remote UE and data indicating Ethernet type, or one or more ProSe service types associated with the PDU session.

Aspect 7: The method of any of Aspects 1-6, wherein the communication includes at least one of: a PDU session identifier, an IP address of the remote UE, a MAC address of the remote UE and data indicating Ethernet type, a remote UE identifier associated with a PKMF, or one or more ProSe service types associated with the PDU session.

Aspect 8: The method of any of Aspects 1-7, wherein receiving the instructions comprises: receiving the instructions via a session management non-access stratum message.

Aspect 9: The method of any of Aspects 1-8, further comprising: receiving, from the SMF device, data indicating a timer associated with the instructions; receiving, from the remote UE, a relay communication associated with the PDU session; and rejecting the relay communication based at least in part on the timer.

Aspect 10: The method of any of Aspects 1-9, further comprising: transmitting, to the remote UE, data indicating a timer associated with a restriction associated with the PDU session.

Aspect 11: The method of any of Aspects 1-10, wherein the wireless device is a Layer 3 relay.

Aspect 12: A method of wireless communication performed by a network device, comprising: receiving, from a relay device, a communication associated with a PDU session associated with the relay device and a remote UE, the communication including information indicating an identifier associated with the remote UE; and transmitting, to the relay device and based at least in part on the identifier, instructions to manage the PDU session.

Aspect 13: The method of Aspect 12, wherein the instructions include: instructions for the relay device to release a link with the remote UE.

Aspect 14: The method of any of Aspects 12-13, wherein the instructions include: instructions for the relay device to modify a link with the remote UE.

Aspect 15: The method of Aspect 14, wherein the instructions to modify the link includes: instructions to remove a packet filter associated with the PDU session.

Aspect 16: The method of any of Aspects 12-15, further comprising: determining to manage the PDU session based at least in part on at least one of: a subscription associated with the remote UE, or an operator policy associated with the PDU session.

Aspect 17: The method of any of Aspects 12-16, wherein the information indicating the identifier comprises the identifier and a PDU session identifier of the PDU session.

Aspect 18: The method of any of Aspects 12-17, wherein the communication includes at least one of: a PDU session identifier, an IP address of the remote UE, a MAC address of the remote UE and data indicating Ethernet type, a remote UE identifier associated with a PKMF, or one or more ProSe service types associated with the PDU session.

Aspect 19: The method of any of Aspects 12-18, wherein transmitting the instructions comprises: transmitting the instructions via a session management non-access stratum message.

Aspect 20: The method of any of Aspects 12-19, further comprising: transmitting, to the relay device, data indicating a timer associated with the instructions.

Aspect 21: The method of any of Aspects 12-20, wherein the network device is an SMF device.

Aspect 22: An apparatus for wireless communication at a device, comprising a processor; memory coupled with the processor; and instructions stored in the memory and executable by the processor to cause the apparatus to perform the method of one or more of Aspects 1-11.

Aspect 23: An apparatus for wireless communication at a device, comprising a processor; memory coupled with the processor; and instructions stored in the memory and executable by the processor to cause the apparatus to perform the method of one or more of Aspects 12-21.

Aspect 24: A device for wireless communication, comprising a memory and one or more processors coupled to the memory, the one or more processors configured to perform the method of one or more of Aspects 1-11.

Aspect 25: A device for wireless communication, comprising a memory and one or more processors coupled to the memory, the one or more processors configured to perform the method of one or more of Aspects 12-21.

Aspect 26: An apparatus for wireless communication, comprising at least one means for performing the method of one or more of Aspects 1-11.

Aspect 27: An apparatus for wireless communication, comprising at least one means for performing the method of one or more of Aspects 12-21.

Aspect 28: A non-transitory computer-readable medium storing code for wireless communication, the code comprising instructions executable by a processor to perform the method of one or more of Aspects 1-11.

Aspect 29: A non-transitory computer-readable medium storing code for wireless communication, the code comprising instructions executable by a processor to perform the method of one or more of Aspects 12-21.

Aspect 30: A non-transitory computer-readable medium storing a set of instructions for wireless communication, the set of instructions comprising one or more instructions that, when executed by one or more processors of a device, cause the device to perform the method of one or more of Aspects 1-11.

Aspect 31: A non-transitory computer-readable medium storing a set of instructions for wireless communication, the set of instructions comprising one or more instructions that, when executed by one or more processors of a device, cause the device to perform the method of one or more of Aspects 12-21.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless device for wireless communication, comprising:

one or more memories; and one or more processors, coupled to the one or more memories, configured to:

receive, via a link between the wireless device, wherein the wireless device is a Layer 3 relay, and a remote user equipment (UE), a remote UE identifier, wherein the remote UE identifier is associated with a proximity services (ProSe) key management function (PKMF); and transmit, to a session management function (SMF) device, a communication associated with a protocol data unit (PDU) session of the remote UE, wherein the communication is based at least in part on the wireless device being the Layer 3 relay, the communication including information indicating the remote UE identifier, associated with the PKMF, and an indication of an associated PDU session identifier.

2. The wireless device of claim 1, wherein the one or more processors are further configured to:

receive, from the SMF device, instructions to manage the PDU session; and release the link based at least in part on receiving the instructions.

3. The wireless device of claim 2, wherein the one or more processors are further configured to:

modify the link based at least in part on receiving the instructions.

4. The wireless device of claim 3, wherein the one or more processors, to modify the link, are configured to:

remove a packet filter associated with the PDU session.

5. The wireless device of claim 1, wherein the one or more processors are further configured to:

receive remote UE data, the remote UE data comprising at least one of:

the remote UE identifier associated with the PKMF, an Internet Protocol (IP) address of the remote UE, a medium access control (MAC) address of the remote UE and data indicating Ethernet type, or one or more ProSe service types associated with the PDU session.

6. The wireless device of claim 1, wherein the communication includes at least one of:

an Internet Protocol (IP) address of the remote UE, a medium access control (MAC) address of the remote UE and data indicating Ethernet type, or one or more ProSe service types associated with the PDU session.

7. The wireless device of claim 1, wherein the one or more processors are configured to:

receive, from the SMF device, instructions to manage the PDU session; and receive the instructions via a session management non-access stratum message.

8. The wireless device of claim 1, wherein the one or more processors are further configured to:

receive, from the SMF device, instructions to manage the PDU session;

receive, from the SMF device, data indicating a timer associated with the instructions;

receive, from the remote UE, a relay communication associated with the PDU session; and reject the relay communication based at least in part on the timer.

9. The wireless device of claim 1, wherein the one or more processors are further configured to:

transmit, to the remote UE, data indicating a timer associated with a restriction associated with the PDU session.

10. The wireless device of claim 1, wherein the associated PDU session identifier corresponds to a PDU session between the remote UE and a network, wherein the PDU session is established for the communications associated with the PDU session of the remote UE.

11. A method of wireless communication performed by a wireless device, comprising:

receiving, via a link between the wireless device, wherein the wireless device is a Layer 3 relay, and a remote user equipment (UE), a remote UE identifier, wherein the remote UE identifier is associated with a proximity services (ProSe) key management function (PKMF); and transmitting, to a session management function (SMF) device, a communication associated with a protocol data unit (PDU) session of the remote UE, wherein the communication is based at least in part on the wireless device being the Layer 3 relay, the communication including information indicating the remote UE identifier, associated with the PKMF, and an indication of an associated PDU session identifier.

12. The method of claim 11, further comprising:

receiving, from the SMF device, instructions to manage the PDU session; and releasing the link based at least in part on receiving the instructions, or modifying the link based at least in part on receiving the instructions.

13. The method of claim 11, wherein the communication includes at least one of:

an Internet Protocol (IP) address of the remote UE, a medium access control (MAC) address of the remote UE and data indicating Ethernet type, or one or more ProSe service types associated with the PDU session.

14. The method of claim 11, wherein the associated PDU session identifier corresponds to a PDU session between the remote UE and a network, wherein the PDU session is established for the communications associated with the PDU session of the remote UE.

15. A non-transitory computer-readable medium storing a set of instructions for wireless communication, the set of instructions comprising:

one or more instructions that, when executed by one or more processors of a wireless device, cause the wireless device to:

receive, via a link between the wireless device, wherein the wireless device is a Layer 3 relay, and a remote user equipment (UE), a remote UE identifier, wherein the remote UE identifier is associated with a proximity services (ProSe) key management function (PKMF); and transmit, to a session management function (SMF) device, a communication associated with a protocol data unit (PDU) session of the remote UE, wherein the communication is based at least in part on the wireless device being the Layer 3 relay, the communication including information indicating the remote UE identifier, associated with the PKMF, and an indication of an associated PDU session identifier.

16. The non-transitory computer-readable medium of claim 15, wherein the one or more instructions are further executable to cause the wireless device to:

receive, from the SMF device, instructions to manage the PDU session; and release the link based at least in part on receiving the instructions.

17. The non-transitory computer-readable medium of claim 16, wherein the one or more instructions are further executable to cause the wireless device to:

modify the link based at least in part on receiving the instructions.

18. The non-transitory computer-readable medium of claim 17, wherein the one or more instructions are further executable to cause the wireless device to:

remove a packet filter associated with the PDU session.

19. The non-transitory computer-readable medium of claim 15, wherein the one or more instructions are further executable to cause the wireless device to:

receive remote UE data, the remote UE data comprising at least one of:

the remote UE identifier associated with the PKMF, an Internet Protocol (IP) address of the remote UE, a medium access control (MAC) address of the remote UE and data indicating Ethernet type, or one or more ProSe service types associated with the PDU session.

20. The non-transitory computer-readable medium of claim 15, wherein the communication includes at least one of:

an Internet Protocol (IP) address of the remote UE, a medium access control (MAC) address of the remote UE and data indicating Ethernet type, or one or more ProSe service types associated with the PDU session.

21. The non-transitory computer-readable medium of claim 15, wherein the one or more instructions are further executable to cause the wireless device to:

receive, from the SMF device, instructions to manage the PDU session; and receive the instructions via a session management non-access stratum message.

22. The non-transitory computer-readable medium of claim 15, wherein the one or more instructions are further executable to cause the wireless device to:

receive, from the SMF device, instructions to manage the PDU session;

receive, from the SMF device, data indicating a timer associated with the instructions;

receive, from the remote UE, a relay communication associated with the PDU session; and reject the relay communication based at least in part on the timer.

23. The non-transitory computer-readable medium of claim 15, wherein the one or more instructions are further executable to cause the wireless device to:

transmit, to the remote UE, data indicating a timer associated with a restriction associated with the PDU session.

24. An apparatus for wireless communication, comprising:

means for receiving, via a link between the apparatus, wherein the wireless device is a Layer 3 relay, and a remote user equipment (UE), a remote UE identifier, wherein the remote UE identifier is associated with a proximity services (ProSe) key management function (PKMF); and means for transmitting, to a session management function (SMF) device, a communication associated with a protocol data unit (PDU) session of the remote UE, wherein the communication is based at least in part on the apparatus being the Layer 3 relay, the communication including information indicating the remote UE identifier, associated with the PKMF, and an indication of an associated PDU session identifier.

25. The apparatus of claim 24, further comprising:

means for receiving, from the SMF device, instructions to manage the PDU session; and means for releasing the link based at least in part on receiving the instructions.

26. The apparatus of claim 25, further comprising:

means for modifying the link based at least in part on receiving the instructions.

27. The apparatus of claim 26, wherein the means for modifying the link further comprise:

means for removing a packet filter associated with the PDU session.

28. The apparatus of claim 24, further comprising:

means for receiving remote UE data, the remote UE data comprising at least one of:

the remote UE identifier associated with the PKMF, an Internet Protocol (IP) address of the remote UE, a medium access control (MAC) address of the remote UE and data indicating Ethernet type, or one or more ProSe service types associated with the PDU session.

29. The apparatus of claim 24, wherein the communication includes at least one of:

an Internet Protocol (IP) address of the remote UE, a medium access control (MAC) address of the remote UE and data indicating Ethernet type, or one or more ProSe service types associated with the PDU session.

30. The apparatus of claim 24, further comprising:

means for receiving, from the SMF device, instructions to manage the PDU session; and means for receiving the instructions via a session management non-access stratum message.

* * * * *